United States Patent [19]
Baresel

[11] 3,769,094
[45] Oct. 30, 1973

[54] METHOD FOR PRODUCING FUEL CELL ELECTRODES HAVING HIGH ACTIVITY
[75] Inventor: Detlef Baresel, Berlin, Germany
[73] Assignee: Robert Bosch GmbH, Stuttgart, Germany
[22] Filed: Jan. 25, 1971
[21] Appl. No.: 109,544

[30] Foreign Application Priority Data
Feb. 6, 1970  Germany................... P 20 05 395.6

[52] U.S. Cl. ............................................... 136/122
[51] Int. Cl. ........................................... H01m 13/04
[58] Field of Search........................... 136/121, 122; 106/56; 252/500, 502, 504, 506, 422; 264/29, 105; 23/209.4, 209.5; 117/226, 46 CC, 46 CB

[56] References Cited
UNITED STATES PATENTS
3,297,490  1/1967  Barber et al. ....................... 136/122
3,380,856  4/1968  Pohl ............................. 136/120 FC FOREIGN PATENTS OR APPLICATIONS
153,566  12/1949  Australia............................. 136/122

*Primary Examiner*—Hyland Bizot
*Assistant Examiner*—M. J. Andrews
*Attorney*—Michael S. Striker

[57] ABSTRACT

Very active fuel cell electrodes are produced by intimately mixing finely comminuted carbides, nitrides or silicides of transition elements of groups IV to VII with a graphite compound or a finely comminuted organic compound which can be pyrolyzed to graphite, decomposing the graphite compound or organic compound while in contact with the carbide, nitride or silicide, and shaping the products into a fuel cell electrode.

4 Claims, No Drawings

METHOD FOR PRODUCING FUEL CELL ELECTRODES HAVING HIGH ACTIVITY

BACKGROUND OF THE INVENTION

Fuel cell electrodes for use in fuel cells with an acid electrolyte are known where the electrode is catalyzed with a noble metal of the platinum-metal series. Due to the fact that these metals are available only in sharply limited quantities and due to their high price, broad use of such electrodes is not possible. It is therefore necessary to search for electrode- and catalyst-materials which are free of noble metals and are nevertheless resistant to corrosion by acid electrolytes.

Noble-metal series fuel cell electrodes made with tungsten carbide (WC) are known. However, the activity of such electrodes is not sufficiently great. They are moreover so selective, that for example, methanol which will surely be used as a fuel in the future due to its low cost, is virtually unaffected by electrodes containing tungsten carbide.

SUMMARY OF THE INVENTION

It is an object of the invention to develop an electrically conductive and corrosion-resistant fuel cell catalyst which provides the greatest possible conversion of fuel.

It is a further object of the invention to explore the so-called hard materials consisting of carbide, nitride, and silicide of the transition metals of the groups IV to VII as fuel cell catalysts.

It is still another object of the invention to develop hard-material catalysts where the hard material consists of more than two components as well as of only two components.

It appears evident that at least part of the difficulty with the hard materials explored to date may be due to the fact that the surface may be rendered inactive by some type of inhibiting layer. Removal of such a layer would presumably convert material into an active catalyst. Up to now, no method had been found to remove such an inhibiting layer.

In accordance with the invention, it has been found that this problem can be solved by bringing the hard material into intimate contact with a graphite compound or with an organic compound which can be pyrolyzed and decomposing either of these types of compounds to produce graphite. Under such circumstances, the hard material is in intimate contact with the graphite as it is being formed. This condition of the graphite has been termed "in statu nascendi." Suitable corrosion-resistant hard materials are the binary or higher complex carbides, nitrides or silicides of the transition metals of groups IV to VII of the periodic system of the elements; examples are TaC, $Ta_3Al_2ZnC$, NbN, $Nb_4SiFe$, $Nb_3Al_2MnC$.

DESCRIPTION OF THE PREFERRED EMBODIMENTS

The chosen hard material is comminuted and intimately mixed with a suspension of a graphite compound, treated with sulfuric acid for a suitable time, after which the residue is washed with water until free of acid. Using suitable graphite compounds, potassium, sodium, sulfuric acid, bromine, aluminum trichloride, iron trichloride or tungsten hexachloride can be embedded in the graphite lattice.

Graphite "in statu nascendi" for the same purpose can also be produced by pyrolysis of organic compounds and especially of polyacrylonitrile.

Using the graphite compounds, atoms, molecules or molecular groups are introduced between the planes parallel to the crystallographic surface (0001). As a result, the hexagonal lattice is significantly expanded in the crystallographic c-direction. The extent of the expansion may be up to several times the original value. The embeddment of the foreign atoms or molecules into the graphite lattice is reversible, the distance between the planes reverting to the original value as the foreign atoms or molecules are removed. The lattice of the graphite compounds is also fairly labile and during the contraction of the lattice substantial forces are generated which, in the presence of the hard material to be worked up into an electrode, cause strong disruptions of the existing surface layers and consequently give rise to activation of the catalyst.

Similar results are achieved when the graphite is produced by pyrolysis of an organic compound in the presence of the hard material. The graphite lattice produced in this way is initially in the labile reactive transitional form which reacts on the surface layers of the hard material in the same way as does the graphite compound. It is particularly appropriate to use compounds for the pyrolysis which result in products which have a substantial electrical conductivity in order to produce an electrode with sufficiently good electrical conductivity.

The following are Examples of the method in accordance with the present invention:

EXAMPLE 1

1.00 g $Ta_3Al_2ZnC$ (granule size about 60 microns) were ground for 15 minutes in a mortar with 3 ml of a suspension of graphite sulfate in concentrated sulfuric acid (corresponding to a graphite content of 0.4 g). After standing for 1/2 hour, the graphite sulfate was decomposed by the addition of 10 ml of 60% sulfuric acid. The remaining residue was filtered off and washed with water until the washings were no longer acid. It was placed in a steel mold and pressed at a pressure of 5 $Mp/cm^2$. The activity of the electrode produced in this way was measured potentiostatically in a standard half-cell arrangement against a hydrogen electrode where the potential difference between the test electrode and the hydrogen electrode was 700 mV. The electrolyte consisted of 3N-sulfuric acid at 70° C containing methanol at a concentration of 3 M/l; the electrolyte was stirred during the period in which the methanol was oxidized.

EXAMPLE 2

0.75 g $Nb_3Al_2MnC$ was placed in a ball mill with 2.0 g of polyacrylonitrile powder (PAN), mixed for 30 minutes, and finally heated to 600° C in an argon stream for 1 hour. A grey-black product resulted which was crushed to about 60 microns and then sieved. The product had a specific surface of 0.44 $m^2/g$. Further treatments and measurements were as presented in Example 1.

The following Table gives the results achieved with electrodes activated in accordance with the present invention. The results are compared with those of untreated electrodes which can be seen to be substantially inferior.

The results given are for the conversion of methanol in microamperes/gram at a constant potential of 700 mV measured against a normal hydrogen electrode where the electrolyte consists of sulfuric acid with dissolved methanol (3N $H_2SO_4$; 3M $CH_3OH$; 70° C.)

TABLE

CURRENT DENSITY (MICROAMPERES PER GRAM)

| Electrode Material | Not Activated | Activated with Graphite Sulfate | Activated with Pyrolyzed PAN |
|---|---|---|---|
| TaC | 0 | 8 | — |
| $Ta_3Al_2ZnC$ | 0 | 15 | — |
| NbN | 10 | — | 20 |
| $Nb_4SiFe$ | 0 | — | 34 |
| $Nb_3Al_2MnC$ | 0 | — | 80 |

As a further example of the hard material described above, an electrode made of $Nb_4SiFe$ activated with the pyrolysis products of PAN was tested for the oxidation of formaldehyde in sulfuric acid as the electrolyte with the test conditions as given above. The current density proved to be 205 microamperes per gram while an unactivated material of the same type gave no current at all.

Using the above process, it has been found possible to prepare noble metal-free fuel cell electrodes for use in fuel cells with acid electrolytes, where the product is corrosion resistant in the medium and in addition is so active that a substantial output of current can be achieved in the oxidation of methanol which hitherto has been resistant to oxidation using noble metal-free electrodes.

Without further analysis, the foregoing will so fully reveal the gist of the present invention that others can be applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

I claim:

1. Method of preparing a corrosion-resistant fuel cell electrode of high catalytic activity, particularly for use in fuel cells with acid electrolyte and fuel dissolved in said electrolyte, comprising the steps of bringing together into intimate contact a comminuted, corrosion-resistant, hard first material and a comminuted, pyrolyzeable second material, said first material being composed of at least one substance selected from the group consisting of the carbides, nitrides and silicides of Ti, Zr, Hf, V, Nb, Ta, Cr, Mo, W and Mn, and said second material being polyacrylonitrile; pyrolyzing said second material so as to at least partially convert the same into graphite while in intimate contact with said first material, to thereby produce a product with a high specific surface area and high catalytic power; and shaping said product into a fuel cell electrode.

2. The method as defined in claim 1, wherein said corrosion-resistant hard material is a material selected from the group consisting of TaC, $Ta_3Al_2ZnC$, NbN, $Nb_4SiFe$ and $Nb_3Al_2MnC$.

3. The method as defined in claim 1, wherein said shaping process comprises pressure-molding.

4. The method as defined in claim 1, wherein the step of pyrolysis is carried out at a temperature of about 600° C.

* * * * *